United States Patent [19]

Suzuki

[11] Patent Number: 4,748,518
[45] Date of Patent: May 31, 1988

[54] CHROMINANCE SIGNAL PROCESSING CIRCUIT FOR COLOR VIDEO REPRODUCING APPARATUS

[75] Inventor: Masao Suzuki, Tokyo, Japan

[73] Assignee: Sony Corporation, Tokyo, Japan

[21] Appl. No.: 948,078

[22] Filed: Dec. 31, 1986

[30] Foreign Application Priority Data

Jan. 17, 1986 [JP] Japan .................................. 61-8530

[51] Int. Cl.$^4$ ............................................. H04N 9/87
[52] U.S. Cl. .................................... 358/312; 358/329
[58] Field of Search ................. 358/312, 327–329, 358/340

[56] References Cited

U.S. PATENT DOCUMENTS

| Re. 29,975 | 4/1979 | Ishigaki et al. | 358/329 X |
|---|---|---|---|
| 4,110,784 | 8/1978 | Amery et al. | 358/329 |
| 4,280,133 | 7/1981 | Kato | 358/329 X |
| 4,513,311 | 4/1985 | Hirai et al. | 358/329 X |
| 4,626,927 | 12/1986 | Hirota et al. | 358/329 X |

Primary Examiner—W. B. Perkey
Attorney, Agent, or Firm—Alvin Sinderbrand

[57] ABSTRACT

In an apparatus having a rotary magnetic head assembly for reproducing a color video signal including a chrominance signal recorded on a magnetic tape in a plurality of successive oblique tracks which selectively have a first width or a second width narrower than the first width; a circuit is provided for processing the chrominance signal separated from the reproduced color video signal and comprises a comb-filter circuit receiving the separated chrominance signal and being selectively controllable to provide a simple or non-feedback type comb-filter or a feedback-type comb-filter, and a filter controller which causes the comb-filter circuit to provide the simple or non-feedback comb-filter when the color video signal is reproduced from a magnetic tape having oblique tracks of the first width and to provide the feedback-type comb-filter when the color video signal is reproduced from a magnetic tape having oblique tracks of the second width.

9 Claims, 2 Drawing Sheets

FIG. 1A PRIOR ART
FIG. 1B PRIOR ART
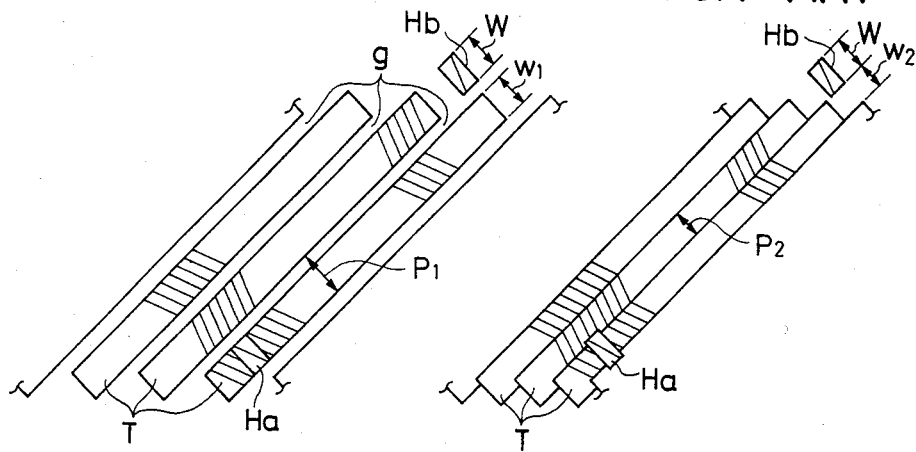
FIG. 2 PRIOR ART
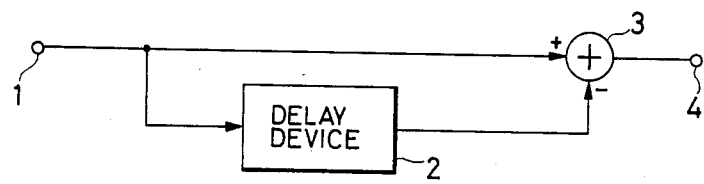
FIG. 3 PRIOR ART
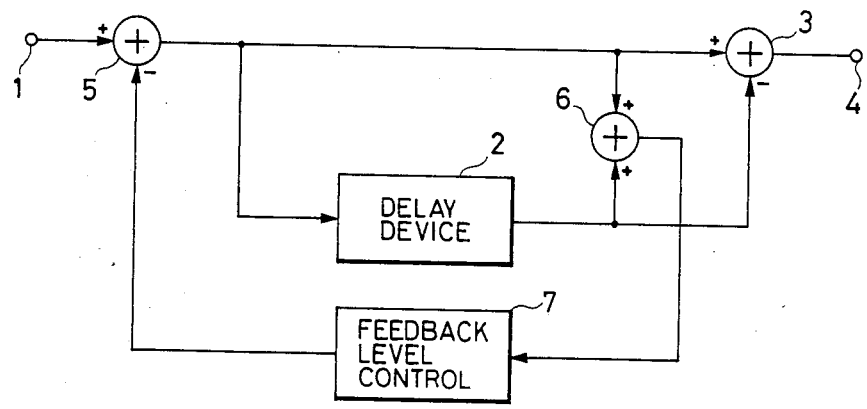

CHROMINANCE SIGNAL PROCESSING CIRCUIT FOR COLOR VIDEO REPRODUCING APPARATUS

BACKGROUND OF THE INVENTION (1.) Field of the Invention

The present invention relates generally to circuits for processing chrominance signals in a color video reproducing apparatus, and more particularly is directed to a circuit for minimizing cross-talk contained in a chrominance signal separated from a color video signal reproduced from a magnetic tape on which the color video signal has been recorded in a plurality of successive oblique tracks.

(2.) Description of the Prior Art

In a widely used video tape recorder (VTR), when recording a color video signal on a magnetic tape, a frequency-modulated luminance signal (hereinafter referred to as an FM luminance signal), which is produced by frequency-modulating an appropriate carrier by a luminance signal separated from the color video signal and a chrominance signal also separated from the color video signal and frequency-converted to have a frequency band lower than the frequency band of the FM luminance signal are mixed or combined to form a composite video signal which is recorded in a plurality of parallel oblique tracks on the magnetic tape. The oblique tracks are formed by a pair of rotary magnetic heads which are supplied with the composite video signal and driven to alternately scan the magnetic tape obliquely in respect to the running direction of the magnetic tape.

For such recording of the color video signal, two operational modes are selectively used in some video tape recorders. In one of these operational modes, which will be referred to as an SP or short-play recording mode and which is illustrated in FIG. 1A of the accompanying drawings, the speed at which the magnetic tape is transported is made to be relatively high so that the pitch $P_1$ between each two adjacent oblique tracks T is larger than the width W of each of the rotary magnetic heads and, therefore, the oblique tracks T are formed on the magnetic tape with spaces or so-called guard bands g between adjacent tracks. In the other mode, which will be referred to as an LP or long-play recording mode and which is illustrated in FIG. 1B of the accompanying drawings, the speed at which the magnetic tape is transported is limited or reduced so that the pitch $P_2$ between each two adjacent oblique tracks T is smaller than the width W of each of the rotary magnetic heads and, therefore, the oblique tracks T are formed immediately adjacent each other on the tape without guard bands between the adjacent tracks so that the recording density of the composite video signal on the magnetic tape is increased and thereby the duration of the recording can be increased.

For reproducing a composite video signal recorded on the magnetic tape using the SP or LP recording mode, a reproducing mode is employed in which the oblique tracks arranged on the magnetic tape are alternately scanned in succession by a pair of rotary magnetic heads which reproduce the FM luminance signal and frequency-converted chrominance signal from each of the oblique tracks and a reproduced color video signal is obtained based on the outputs of the rotary magnetic heads. In such case, the problem of "cross-talk" between closely arranged oblique tracks arises in reproduction of the FM luminance signal and the frequency-converted chrominance signal. For the purpose of suppressing such cross-talk, the rotary magnetic heads used for recording the composite color video signal on the magnetic tape are provided with gaps having different azimuth angles, so that each adjacent two of the oblique tracks are recorded by rotary magnetic heads with different gap angles (head azimuth angles), respectively, for example, as are shown for the oblique tracks T in FIGS. 1A and 1B. Subsequently, during reproduction, each oblique track is scanned by the rotary magnetic head Ha or Hb (FIGS. 1A and 1B) having the corresponding gap angle for reading the composite color video signal therefrom, with the result that a beneficial azimuth loss is experienced in respect to the cross-talk derived from adjacent oblique tracks.

With such arrangements of the gap angles of the rotary magnetic heads, substantial azimuth loss and corresponding reduction in cross-talk is obtained in respect of the FM luminance signal which resides in a relatively high frequency band. Therefore, the cross-talk in respect to the FM luminance signal reproduced from the magnetic tape by the rotary magnetic heads is sufficiently diminished. However, the azimuth loss is not very effective for cross-talk in respect of the frequency-converted chrominance signal which resides in a relatively low frequency band, so that other measures are taken for minimizing cross-talk in respect of the frequency-converted chrominance signal read from the magnetic tape by the rotary magnetic heads. For example, the cross-talk in respect of the frequency-converted chrominance signal reproduced by the rotary magnetic heads from the magnetic tape is substantially eliminated by recording the frequency-converted chrominance signal on the magnetic tape with its carrier having constant phase in alternate oblique tracks and with its carrier reversed in phase at every horizontal period in the other alternate oblique tracks, and by frequency-converting the frequency-converted chrominance signal reproduced from the magnetic tape so as to provide the carrier thereof with its original frequency and a predetermined phase and then making it pass through a so-called comb-filter.

FIG. 2 shows a basic or simple comb-filter previously proposed to be used for suppressing the cross-talk in the reproduced chrominance signal as mentioned above. This simple comb-filter is shown to have an input terminal 1 from which the reproduced chrominance signal is supplied directly to one input of a subtracter 3. The reproduced chrominance signal is also supplied through a delay device 2 providing a delay of one horizontal period to another input of the subtracter 3, and an output of subtracter 3 is lead to an output terminal 4.

When using the comb-filter shown in FIG. 2, it is possible that the cross-talk will not be sufficiently diminished if the reproduced chrominance signal contains a large amount of cross-talk in respect of the frequency converted chrominance signal. Accordingly, a feedback-type comb-filter has been also proposed to be used for suppressing the cross-talk in the reproduced chrominance signal, for example, as specifically disclosed in Japanese patent application published before examination under publication No. 56/60186. In such a feedback-type comb-filter, as shown in FIG. 3, the reproduced chrominance signal from an input terminal 1 is supplied to one input of a subtracter 5 and an output of subtracter 5 is supplied directly to one input of a subtracter 3 and, through a delay device 2 which delays the output of subtracter 5 by one horizontal period, to the other input of subtracter 3. Once again, the output of subtracter 3 is connected to an output terminal 4. Further, the output of subtracter 5 is also supplied directly to one input of an adder 6 which has another input connected to the output of delay device 2 and an output of adder 6 is fed through a feedback level controller 7 to another input of subtracter 5 so as to form a feedback loop.

With the feedback-type comb-filter shown in FIG. 3, the reproduced chrominance signal supplied to input terminal 1 is subjected repeatedly to substantial cross-talk suppression by the simple comb-filter which is constituted by delay device 2 and subtracter 3. Therefore, cross-talk in respect of the reproduced chrominance signal is sufficiently diminished or minimized, so that the chrominance signal appearing at output terminal 4 is processed to have an improved signal to noise (S/N) ratio.

As described above, when the feedback-type comb-filter is used for suppressing cross-talk in respect of the reproduced chrominance signal, it is expected that the cross-talk will be sufficiently diminished or minimized even though the reproduced chrominance signal contains a large amount of cross-talk. In such case, however, since the reproduced chrominance signal passes repeatedly through the simple comb-filter for providing the chrominance signal with an improved signal to noise (S/N) ratio at the output terminal 4, there is the problem that the chrominance signal appearing at output terminal 4 causes so-called color penetration in the vertical direction on a picture obtained from a reproduced color video signal containing the chrominance signal appearing at output terminal 4. This problem will be hereinafter referred to merely as the problem of vertical color penetration.

Returning to the discussion of the recording of the color video signal on the magnetic tape, it will be seen that the width $w_1$ of each oblique track on the magnetic tape in which the composite color video signal is recorded in the SP recording mode, such as the oblique track T shown in FIG. 1A, is wider than the width $w_2$ of each oblique track formed on the magnetic tape when using the LP recording mode. Further, as earlier noted, each oblique track recorded on the magnetic tape when using the SP recording mode is accompanied by the guard bands at the opposite sides thereof. As a result, there is a difference between the reproduced chrominance signal obtained in a first reproducing mode, which will be referred to as an SP reproducing mode, and in which oblique tracks recorded on the magnetic tape by using the SP recording mode are scanned alternately by two rotary magnetic heads Ha and Hb each having a width W smaller than the pitch $P_1$ between each two adjacent oblique tracks which are separated by guard bands g, as shown in FIG. 1A, and the reproduced chrominance signal obtained in a second reproducing mode, which will be referred to as an LP reproducing mode, and in which oblique tracks recorded on the magnetic tape by using the LP recording mode are scanned alternately by the two rotary magnetic heads Ha and Hb each having a width W larger than the pitch $P_2$ between each two adjacent oblique tracks recorded without the guard bands, as in FIG. 1B. In other words, the reproduced chrominance signal obtained in the SP reproducing mode contains a relatively small amount of cross-talk so that its S/N ratio is not greatly reduced, while the reproduced chrominance signal obtained in the LP reproducing mode contains a relatively large amount of cross-talk by which its S/N ratio is considerably deteriorated.

Accordingly, the simple or non-feedback type comb-filter shown in FIG. 2 may be used for sufficiently suppressing the cross-talk contained in the reproduced chrominance signal so as to obtain a chrominance signal of high quality only when the SP reproducing mode is being employed. However, the cross-talk suppression by the simple or nonfeedback-type comb-filter is not sufficient when the reproduced chrominance signal is obtained in the LP reproducing mode and therefore contains a large amount of cross-talk. On the other hand, when the feedback-type comb-filter shown in FIG. 3 is used for suppressing the cross-talk contained in the reproduced chrominance signal obtained in the LP reproducing mode, a chrominance signal processed to sufficiently eliminate or minimize the cross-talk and to have high quality is obtained at the output terminal of the feedback-type comb-filter. However, a chrominance signal having an excessively improved S/N ratio and giving rise to problems, such as, vertical color penetration as mentioned above, appears at the output terminal of the feedback-type comb-filter if the latter is used in the SP reproducing mode.

OBJECTS AND SUMMARY OF THE INVENTION

Accordingly, it is an object of the present invention to provide a chrominance signal processing circuit which avoids the aforementioned problems encountered with the prior art.

More particularly, it is an object of the present invention to provide a chrominance signal processing circuit which is operative on a reproduced chrominance signal obtained from a color video signal reproduced from a magnetic tape on which luminance and chrominance signals constituting the color video signal are recorded in a plurality of oblique tracks each having either a first track width or a second track width narrower than the first track width, and in which, in either case, the reproduced chrominance signal is processed to appropriately suppress cross-talk and to have high quality without giving rise to the problem of vertical color penetration.

Another object is to provide a chrominance signal processing circuit, as aforesaid, having a comb-filter circuit and being operable in a first reproducing mode wherein a color video signal is reproduced from oblique tracks recorded on the magnetic tape with the first track width and the chrominance signal contained in the reproduced color video signal is processed to sufficiently diminish any cross-talk therein and to have a S/N ratio appropriately improved, or in a second reproducing mode wherein the color video signal is reproduced from oblique tracks recorded on the magnetic tape with the second track width and cross-talk in respect to the reproduced chrominance signal is again sufficiently suppressed.

A further object of the present invention is to provide a circuit for processing a chrominance signal which is obtained from a color video signal reproduced from a magnetic tape on which luminance and chrominance signals constituting the color video signal are recorded in a plurality of oblique tracks each having a first track width or a second track width narrower than the first track width and the reproduced chrominance signal is made to pass through a comb-filter circuit to be processed thereby, and in which the comb-filter circuit is controlled to form a simple or nonfeedback-type comb-filter in a first reproducing mode wherein the color video signal is reproduced from oblique tracks on the tape each having the first track width or to form a feedback-type comb-filter in a second reproducing mode wherein the color video signal is reproduced from oblique tracks on the tape each having the second track width.

According to an aspect of the present invention, there is provided in a color video reproducing apparatus having a rotary magnetic head assembly which reproduces a color video signal including a chrominance signal recorded on a magnetic tape in a plurality of successive oblique tracks selectively having a first track width or a second track width narrower than the first track width; a circuit for processing the chrominance signal separated from the reproduced color video signal and which comprises a comb-filter circuit receiving the separated chrominance signal and being selectively controllable to provide a simple comb-filter or a feedback-type comb-filter, and a filter controller for causing the comb-filter circuit to provide the simple or nonfeedback-type comb-filter when the color video signal is reproduced by the rotary magnetic head assembly from a magnetic tape having oblique tracks of the first width and to provide the feedback-type comb-filter when the color video signal is reproduced by the rotary magnetic head assembly from a magnetic tape having oblique tracks of the second width.

In the circuit arrangement thus constituted in accordance with the present invention, the comb-filter circuit is controlled by the filter controller to provide the simple or nonfeedback-type comb-filter for processing the reproduced chrominance signal when the rotary magnetic head assembly scans oblique tracks having the first track width, which is relatively wide, so that the reproduced chrominance signal contains a relatively small amount of cross-talk, and the comb-filter circuit is further controlled by the filter controller to provide the feedback-type comb-filter for processing the reproduced chrominance signal when the rotary magnetic head assembly scans abutting oblique tracks having the second track width, which is relatively narrow, so that the reproduced chrominance signal contains a large amount of cross-talk. In each case, the cross-talk is appropriately suppressed and the processed chrominance signal has high quality while avoiding the problem of vertical color penetration due to excessive cross-talk suppression as would occur if the feedback-type comb-filter was provided while the color video signal is read by the rotary magnetic head assembly from oblique tracks each having the first or relatively large track width resulting in a relatively small amount of cross-talk.

The above, and other objects, features and advantage of the present invention, will become apparent from the following detailed description which is to be read in conjunction with the accompanying drawings in which the same reference numerals identify corresponding parts and elements in the several views.

BRIEF DESCRIPTION OF THE DRAWINGS

FIGS. 1A and 1B are diagrams showing different arrangements of oblique tracks traced on magnetic tapes by rotary magnetic heads;

FIG. 2 is a block diagram showing an example of a simple or nonfeedback-type comb-filter used in the prior art for suppressing cross-talk;

FIG. 3 is a block diagram showing an example of a feedback-type comb-filter used in the prior art for suppressing cross-talk;

DESCRIPTION OF THE PREFERRED EMBODIMENT

Figure 4:
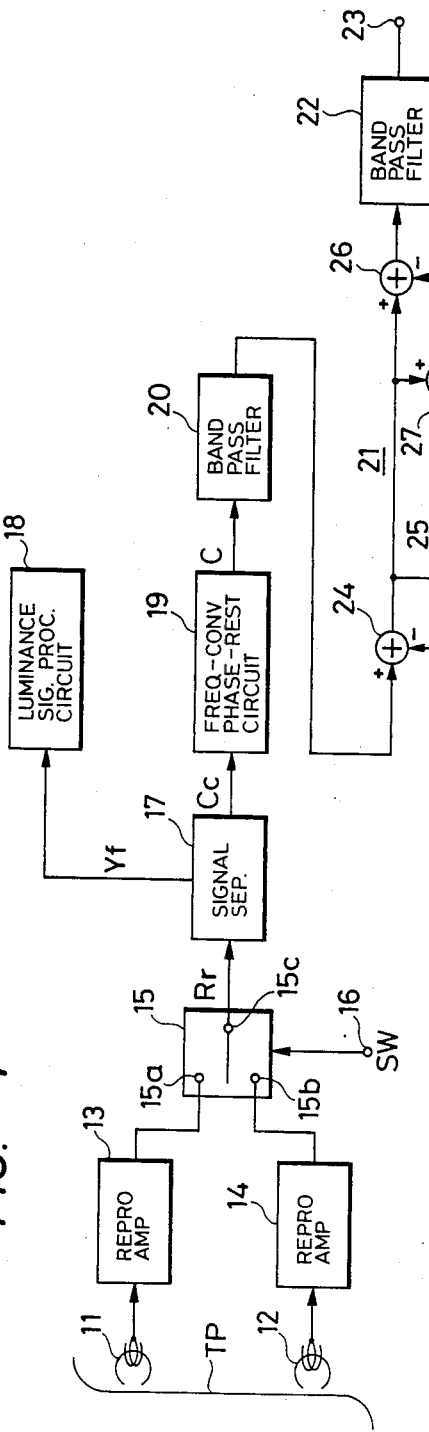
FIG. 4 is a block diagram showing a chrominance signal processing circuit for a color video reproducing apparatus according to one embodiment of the present invention.

Referring in detail to FIG. 4, it will be seen that a circuit is their shown for processing a chrominance signal in a color video signal reproducing apparatus which is operative to obtain reproduced luminance and chrominance signals from a magnetic tape TP on which an FM luminance signal and a frequency-converted chrominance signal (constituting a composite color video signal) are recorded in a plurality of oblique tracks. The color video signal for one field period is recorded in each of the oblique tracks on the magnetic tape, and such oblique tracks have a relatively wide width and are formed with guard bands at the opposite sides thereof in the SP recording mode, for example, as in the oblique tracks T with the guard bands as shown in FIG. 1A. Alternately, each of the oblique tracks may have a relatively narrow width and be formed without guard bands in the LP recording mode, as is shown in FIG. 1B.

A pair of rotary magnetic heads 11 and 12 (FIG. 4) alternately scan the successive oblique tracks arranged on the magnetic tape TP to reproduce therefrom, at each scanning, the FM luminance signal and the frequency-converted chrominance signal constituting the color video signal recorded in the respective oblique tracks being scanned. The outputs of the rotary magnetic heads 11 and 12 are connected through reproducing amplifiers 13 and 14 to fixed contacts 15a and 16a, respectively, of a switch 15. A movable contact 15c of switch 15 is moved in response to a switching signal SW suitably supplied to a terminal 16 so as to be connected alternately with the fixed contacts 15a and 15b in synchronism with each scanning of magnetic tape TP by rotary magnetic heads 11 and 12. Thus, the color video signal read or reproduced by rotary magnetic head 11 and amplified by reproducing amplifier 13, and the color video signal read by rotary magnetic head 12 and amplified by reproducing amplifier 14 appear alternately at movable contact 15c of switch 15. It will be appreciated that rotary magnetic heads 11 and 12, reproducing amplifiers 13 and 14 and switch 15 constitute signal reproducing or reading means.

A signal separator 17 for separately extracting the FM luminance signal and the frequency-converted chrominance signal from the color video signal reproduced by rotary magnetic heads 11 and 12 is connected to the output of the signal reading means, that is, to the movable contact 15c of switch 15. One output of signal separator 17 at which the separated FM luminance signal is obtained is connected to a luminance signal processing circuit 18 and another output of signal separator 17 at which the separated frequency-converted chrominance signal is obtained is connected to a frequency-converting and phase-restoring circuit 19 for subjecting the frequency-converted chrominance signal to frequency-conversion and phase restoration.

More particularly, in the frequency-converting and phase-restoring circuit 19, the frequency-converted chrominance signal from signal separator 17 is frequency-converted to a reproduced chrominance signal having a carrier of the original frequency. Further, during such frequency-conversion, the carrier of the frequency-converted chrominance signal, which was conventionally recorded with a constant phase in alternate field periods and with its phase reversed at every horizontal period in the other alternate field periods for the purpose of cross-talk suppression, is restored so that the carrier of the reproduced chrominance signal emerging from circuit 19 has a predetermined phase. The reproduced chrominance signal having the carrier of the original frequency and of the predetermined phase obtained at the output of frequency-converting and phase restoring circuit 19 is passed therefrom through a band pass filter 20. The signal separator 17, frequency-converting and phase restoring circuit 19 and band pass filter 20 constitute signal separating means for obtaining the reproduced chrominance signal from the output of the signal reading means.

The output of band pass filter 20 is supplied to a comb-filter circuit 21 according to this invention and the output of comb-filter circuit 21 is connected through a band pass filter 22 to an output terminal 23.

The comb-filter circuit 21 comprises a subtracter 24 having a first input connected to the output of band pass filter 20, a delay device 25 connected to the output of subtracter 24 for delaying the reproduced chrominance signal passing through band pass filter 20 by one horizontal period, a subtracter 26 having first and second inputs connected to the output of subtracter 24 and to the output of delay device 25, respectively, an adder 27 having first and second inputs connected to the output of subtracter 24 and the output of delay device 25, respectively, a feedback level controller 28 connected to the output of adder 27, and a switch 29 connected between feedback level controller 28 and a second input of subtracter 24. The output of subtracter 26 is connected to the input of band pass filter 22. The switch 29 is provided with a control terminal 30 to which an LP reproducing mode signal SL is supplied. Such signal SL is supplied, or is at the "1" level, when the LP reproducing mode is selected, that is, when the rotary magnetic heads 11 and 12 alternately scan oblique tracks that were formed on the magnetic tape TP using the LP recording mode. Switch 29 is closed or in its ON state in response to signal SL being "1".

The switch 29 is kept in its open or OFF state so as to separate feedback level controller 28 from subtracter 24 so long as LP reproducing mode signal SL is not supplied to control terminal 30, that is, when signal SL is "0", as during reproducing from tracks that were recorded in the SP recording mode. When feedback level controller 28 is separated from subtracter 24 by opening switch 29, comb-filter circuit 21 forms a nonfeedback or simple comb-filter comprised of delay device 25 and subtracter 26. On the other hand, when feedback level controller 28 is coupled with the second input of subtracter 24 through the closing of switching 29, comb-filter circuit 21 forms a feedback-type comb-filter comprised of delay device 25, subtracter 26, adder 27, feedback level controller 28 and subtracter 24. Thus, comb-filter circuit 21 selectively forms either a nonfeedback-type or simple comb-filter or a feedback-type comb-filter, and switch 29 serves as a filter controller for causing circuit 21 to form the feedback-type comb-filter in response to the high level of LP reproducing mode signal SL.

With the system embodying the present invention, as described above, when rotary magnetic heads 11 and 12 scan the oblique tracks recorded on magnetic tape TP, the color video signal reproduced from the oblique tracks by the rotary magnetic heads 11 and 12 are alternately derived by switch 16 after passing through reproducing amplifiers 13 and 14, respectively, so that a continuous color video signal Rr is obtained at movable contact 15c of switch 15 and supplied to signal separator 17. At one output of signal separator 17, an FM luminance signal Yf is derived from continuous color video signal Rr and is supplied to luminance signal processing circuit 18 from which a reproduced luminance signal is obtained.

At another output of signal separator 17, a frequency-converted chrominance signal Cc is derived from the continuous color video signal Rr and is supplied to frequency-converting and phase restoring circuit 19 which provides a reproduced chrominance signal C with its carrier having the original frequency and predetermined phase. The chrominance signal C obtained from frequency-converting and phase-restoring circuit 19 is passed through band pass filter 20 to the first input of subtracter 24 in the comb-filter circuit 21.

Figure 5:
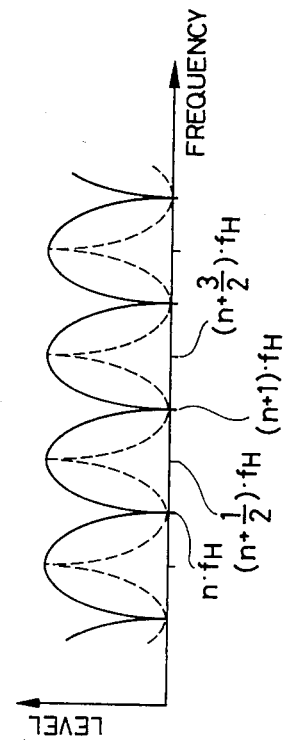
FIG. 5 is a diagram showing the characteristics of a comb-filter circuit included in the embodiment shown in FIG. 4.

When magnetic tape TP is provided with oblique tracks which were formed while recording the color video signal in the SP recording mode, the SP reproducing mode is used, that is, the oblique tracks on the magnetic tape TP are scanned alternately by rotary magnetic heads 11 and 12 each having a width smaller than the pitch between each two adjacent oblique tracks. At such time, the LP reproducing mode signal SL is not supplied to control terminal 30 so that switch 29 is kept in the OFF state. Therefore, comb-filter circuit 21 forms the nonfeedback-type or simple comb-filter having a toothed band pass characteristic shown with a solid line in FIG. 5, where $f_H$ represents the horizontal frequency and n represents a positive integer. Accordingly, the reproduced chrominance signal C supplied to the comb-filter circuit 21 is subjected to cross-talk suppression by the nonfeedback-type comb-filter having the toothed band pass characteristic shown with the solid line in FIG. 5. The reproduced chrominance signal processed to contain suppressed cross-talk is passed from comb-filter circuit 21 through band pass filter 22 to output terminal 23.

When using the SP reproducing mode, as above, each of the rotary magnetic heads 11 and 12 scanning an oblique track on the magnetic tape TP has a width smaller than the pitch between each two adjacent oblique tracks, so that the reproduced chrominance signal C passed through band pass filter 20 to comb-filter circuit 21 contains a relatively small amount of cross-talk. Consequently, the reproduced chrominance signal processed by the nonfeedback-type or simple comb-filter has its cross-talk appropriately suppressed thereby and is of high quality without giving rise to the problem of vertical color penetration.

On the other hand, when the magnetic tape TP is provided with oblique tracks in which the color video signal was recorded while using the LP recording mode, reproducing is effected in the LP reproducing mode in which the oblique tracks on magnetic tape TP are scanned alternately by rotary magnetic heads 11 and 12 each having a width larger than the pitch between each two adjacent oblique tracks. In this case, the LP reproducing mode signal SL is supplied to control terminal 30 and switch 29 is kept in its ON state, so that comb-filter circuit 21 forms a feedback-type comb-filter having the toothed band pass characteristic shown with a broken line in FIG. 5. Accordingly, the reproduced chrominance signal C supplied to comb-filter circuit 21 is subjected to cross-talk suppression by the feedback-type comb-filter having the toothed band pass characteristic shown with the broken line in FIG. 5, and the resulting processed chrominance signal with its cross-talk suppressed is supplied from filter circuit 21 through band pass filter 22 to output terminal 23.

In the last described case using the LP reproducing mode, since each of rotary magnetic heads 11 and 12 scanning the oblique tracks on the magnetic tape TP has a width larger than the pitch between each two adjacent oblique tracks, the reproduced chrominance signal C passed through band pass filter 20 contains a relatively large amount of cross-talk. However, the reproduced chrominance signal processed by the feedback-type comb-filter has the cross talk sufficiently diminished and its S/N ratio is improved appropriately.

In the manner described above with reference to FIG. 4, the reproduced chrominance signal is processed to have the cross-talk therein sufficiently suppressed and to have its S/N ratio improved appropriately in both the SP reproducing mode and the LP reproducing mode.

Although the delay device 25 has been described as delaying the reproducing chrominance signal by one horizontal period in the comb-filter circuit 21 of the embodiment of the invention shown on FIG. 4, it is to be understood that such delay device in the comb-filter circuit 21 according to the invention may delay the chrominance signal by N × the horizontal period, in which N is an odd number.

Having described in detail an illustrative embodiment of the invention, it will be appreciated that the invention is not limited to that precise embodiment, and that various changes and modifications may be effected therein by one skilled in the art without departing form the scope or spirit of the invention as defined in the appended

What is claimed is:

1. In a color video reproducing apparatus having a rotary magnetic head assembly which reproduces a color video signal including a chrominance signal recorded on a magnetic tape in successive tracks extending obliquely across the tape and selectively having a first width or a second width narrower than said first width, a chrominance signal processing circuit comprising:

signal separating means for separating the chrominance signal from the color video signal reproduced by said rotary magnetic head assembly;

comb-filter means connected to receive the reproduced chrominance signal from said signal separating means and being selectively controllable to provide a simple comb-filter and a feedback-type comb-filter, respectively, for processing said reproduced chrominance signal; and filter control means for causing said comb-filter means to provide said simple comb-filter when said rotary magnetic head assembly reproduces said color video signal from a magnetic tape having oblique tracks of said first width, and to provide said feedback-type comb-filter when said color video signal is being reproduced from oblique tracks of said second width.

2. A color video reproducing apparatus according to claim 1; in which said chrominance signal, as included in the recorded color video signal, is frequency-converted; and wherein said signal separating means includes a signal separator for extracting said frequency-converted chrominance signal from an output of the rotary magnetic head assembly, frequency-converting and phase restoring means for frequency-converting the frequency-converted chrominance signal to obtain said reproduced chrominance signal supplied to said comb-filter means and simultaneously restoring a carrier of said reproduced chrominance signal, as supplied to said comb-filter means, to a predetermined phase, and a band pass filter for passing therethrough only said reproduced chrominance signal to be supplied to said comb-filter means from said frequency-converting and phase restoring means.

3. A color video reproducing apparatus according to claim 1; wherein said comb-filter means includes a first subtracter having one input receiving said reproducing chrominance signal from said signal separating means, a delay device connected to an output of said first subtracter for delaying, by one horizontal period of the color video signal, the reproduced chrominance signal as received from said first subtracter, a second subtracter having one input connected to said output of the first subtracter and another input receiving the delayed chrominance signal from an output of said delay device for providing a processed chrominance signal at an output of said second subtracter, an adder having two inputs connected to said outputs of said first subtracter and said delay device, respectively, and a feedback path connected between an output of said adder and another input of said first subtracter; and wherein said filter control means includes a switch provided in said feedback path for selectively feeding an output of said adder to said other input of said first subtracter.

4. A color video reproducing apparatus according to claim 3; wherein said feedback path includes feedback level control means connected between said output of said adder and said other input of said first subtracter.

5. A color video reproducing apparatus according to claim 4; wherein said switch is connected between the output of said adder and the other input of said first subtracter in series with said feedback level control means.

6. A color video reproducing apparatus according to claim 3; wherein said switch is closed for feeding said output of the adder to said other input of the first subtracter and thereby providing said feedback-type comb-filter when the color video signal is being reproduced from said oblique tracks of the second width, and said switch is opened to provide said simple comb-filter when the color video signal is reproduced from said oblique tracks of the first width.

7. A color video reproducing apparatus according to claim 1; in which said rotary magnetic head assembly has heads of a width substantially equal to said first width, and said tracks having said second width are recorded with adjacent tracks abutting.

8. A color video reproducing apparatus according to claim 7; in which there are two of said heads with gaps having different azimuth angles and which reproduce the color video signal recorded in adjacent respective ones of said oblique tracks with corresponding azimuth angles; and in which said color video signal further includes a luminance signal which, as recorded, is frequency modulated and said chrominance signal, as included in the recorded color video signal, is frequency-converted to a band below the frequency modulated luminance signal so that cross-talk is substantially minimized by azimuth-loss only as to the relatively high-frequency band of the frequency modulated luminance signal.

9. A color video reproducing apparatus according to claim 8; in which said frequency converted chrominance signal is recorded in alternate oblique tracks with its carrier of constant phase, and the phase of said carrier is reversed at each horizontal period for the converted chrominance signal recorded in the remaining oblique tracks interposed between said alternate tracks so that cross-talk as to said relatively low frequency converted chrominance signal is substantially minimized by said comb-filter means.

* * * * *